United States Patent [19]

Beery

[11] 4,055,698
[45] Oct. 25, 1977

[54] POLYOLEFIN WEB HAVING REMOISTENABLE ADHESIVE BONDED THERETO

[75] Inventor: Floyd T. Beery, Prairie Village, Kans.

[73] Assignee: Hallmark Cards, Incorporated, Kansas City, Mo.

[21] Appl. No.: 699,702

[22] Filed: June 25, 1976

[51] Int. Cl.$^2$ ............................ B32B 7/10; B32B 7/12; D04H 13/00
[52] U.S. Cl. .................................... 428/262; 428/346; 428/350; 428/286; 428/354; 428/355; 428/364; 428/375; 428/913; 428/420; 428/523; 428/516; 428/518; 427/407 E
[58] Field of Search .............. 428/326, 346, 350, 355, 428/354, 420, 523, 516, 913, 364, 262, 375, 286; 427/407 E

[56] References Cited

U.S. PATENT DOCUMENTS

| | | | |
|---|---|---|---|
| 2,400,995 | 5/1946 | Humphner | 428/913 X |
| 3,075,857 | 1/1963 | Fior et al. | 428/523 |
| 3,294,577 | 12/1966 | Mayer | 428/516 X |
| 3,708,388 | 1/1973 | Lindemann et al. | 428/520 X |
| 3,869,333 | 3/1975 | McMaster | 428/354 X |
| 3,906,135 | 9/1975 | Krutzel | 428/520 X |

Primary Examiner—P. C. Ives
Attorney, Agent, or Firm—Schmidt, Johnson, Hovey & Williams

[57] ABSTRACT

An inexpensive, easy-to-produce, adhesive-coated polyolefin ribbon or the like is provided which has desirable remoistenability and excellent peel strength characteristics, notwithstanding elimination of the need of physically treating the polyolefin substrate prior to adhesive coating by methods such as chemical etching or other means of surface abrading. A primer layer is applied and bonded directly to the polyolefin ribbon without any preliminary treatment thereof, and a remoistenable adhesive layer containing polyvinyl alcohol is applied over the primer layer and bonded thereto to complete the ribbon. In preferred forms, the primer layer includes respective quantities of ethylene vinyl acetate and chlorinated polyolefin material, and this has been shown to synergistically bond to both the substrate and polyvinyl alcohol remoistenable adhesive applied thereover. A method of producing the ribbon is also provided and includes the steps of sequentially applying and drying the initially liquid primer and adhesive layers to the substrate to present the final remoistenable ribbon product.

14 Claims, No Drawings

POLYOLEFIN WEB HAVING REMOISTENABLE ADHESIVE BONDED THERETO

This invention relates to specially coated polyolefin ribbons or webs which have the desirable property of remoistenability and can be produced without the necessity of expensive physical treatment of the ribbon or web prior to application of a remoistenable adhesive. More particularly, it is concerned with such ribbons or the like which preferably include a primer layer bonded directly to the untreated substrate, with a remoistenable adhesive layer including polyvinyl alcohol applied over the primer layer and bonded thereto in order to synergistically enhance the peel and shear strengths of the completed ribbon.

Remoistenable ribbons have been used for a number of years for gift wrappings, bows and other ribbon decorations. The popularity of remoistenable ribbon is chiefly attributable to the fact that it can be easily adhered to paper or itself simply by wetting a portion of the ribbon and pressing it into engagement with the adherence area. Thus, the need for pressure sensitive tape and the like in producing ribbon decorations is completely eliminated. A number of ribbon substrates have been used in the past in producing remoistenable ribbons. The most common in use today are made of rayon or acetate, but these materials are sometimes difficult to obtain and are relatively expensive.

Polyolefin ribbons are also well-known in the art, and have the advantage of wide availability and relative cheapness. However, such polyolefin ribbons (principally polyethylene and polypropylene) are generaly considered to be unsuitable for producing remoistenable ribbons because of their chemical inertness and extremely low surface energy. While these properties are advantageous in many applications, they present serious problems when it is desired to adhere a coating such as printing ink, metal foils, paints or adhesives to a polyolefin web. This problem has been overcome in the past by pretreating the web surface to raise its surface energy and create more chemically active sites. For example, it has been known to treat polyolefin webs by chemical etching, flame treatment, corona discharge and surface abrading techniques to make possible application of coatings and the like. However, these expedients are time-consuming and expensive, and the resultant pretreated surfaces are still extremely hydrophobic and not appreciably receptive to water-based adhesive systems such as those commonly used in making remoistenable ribbons. Hence, there has heretofore been really no acceptable way of making a remoistenable polyolefin ribbon.

In addition to decorative ribbons, many other types of polyolefin substrates could advantageously be coated with a remoistenable adhesive. For example, polyolefin webs or sheets used in making food storage bags or a wide variety of other items could be coated with remoistenable adhesives, if an economically acceptable method of effective adhesive application were available. Thus, it is to be understood that the methods hereinafter described can be used in a large number of instances where provision of a remoistenable adhesive is beneficial.

It is therefore the most important object of the present invention to provide a remoistenable polyolefin ribbon or the like which has a layer of remoistenable partially hydrolyzed polyvinyl alcohol adhesive adhered thereto in a manner to give the resultant ribbon excellent peel and shear strengths, and without the necessity of physical pretreatment of the polyolefin substrate, as has heretofore been thought necessary for applying coatings to polyolefin materials.

As a corollary to the foregoing, another object of the invention is to provide a remoistenable polyolefin ribbon which includes a polyolefin (preferably polypropylene or polyethylene) substrate material, with a primer layer applied over the substrate and a remoistenable polyvinyl alcohol adhesive layer applied over the primer layer; the primer layer is preferably characterized by the properties of bonding both to the substrate and outermost remoistenable adhesive layer, in order to enhance the desirable properties of the final ribbon.

Another object of the invention is to provide a remoistenable polyolefin ribbon which includes a primer layer comprising the dried residue of an initially liquid coating composition which includes a member selected from the group consisting of the pressure sensitive adhesives, chlorinated polyolefins, copolymerized olefinic vinyl acetates, and mixtures thereof, in conjunction with a remoistenable adhesive layer which comprises the dried residue of a coating composition which includes a solids fraction of polyvinyl alcohol dispersed in water; in the most preferred form, a primer having ethylene vinyl acetate and chlorinated polyolefin materials therein is used, and such a primer layer has been shown to synergistically enhance the peel and shear strengths of the resultant adhesive ribbon without the necessity of expensive surface treatment of the underlying polyolefin substrate.

Finally, another aim of the invention is to provide a method of applying a remoistenable adhesive to a polyolefin ribbon or the like which includes the steps of applying a primer composition in liquid form to the polyolefin substrate, drying the primer to present a dried residue layer, applying a remoistenable polyvinyl alcohol adhesive composition over the primer layer and drying the adhesive composition; treatment in this manner provides an effective remoistenable ribbon without any pretreatment whatsoever of the underlying substrate, and at extremely low cost.

In its broadest aspects, the present invention is concerned with a remoistenable polyolefin ribbon or web which includes a substrate formed of a conventional polyolefin material, such as polyethylene or polypropylene, in conjunction with a remoistenable polyvinyl alcohol adhesive applied over and adhered to the substrate material. This is preferably accomplished through the use of a primer layer applied directly to the substrate which has the properties of bonding both to the substrate and the remoistenable PVA adhesive layer.

In more detail, the polyolefin substrate may comprise an elongated ribbon or web, or any relatively thin sheet of polyolefin material. As indicated above, the most common and preferred polyolefin materials are the polypropylenes and polyethylenes, but it is to be understood that any essentially polyolefin material can be used in the context of the present invention; furthermore, the invention is not limited to decorative ribbons or the like, but can be used to good advantage with amu polyolefin sheet web for producing a wide variety of items. Also, as will be explained, no pretreatment of the polyolefin material to increase its surface energy is necessary to the present invention, by virtue of the synergistic behavior of the primer and adhesive layers.

The primer layer applied to the polyolefin substrate comprises the dried residue of an initially liquid or flowable coating composition which preferably includes a member selected from the group consisting of the pressure sensitive adhesives, chlorinated polyolefins, copolymerized olefinic vinyl acetates, and mixtures thereof. Mixtures of copolymerized olefinic vinyl acetates and chlorinated polyolefins are especially advantageous, and in the most preferred form the primer layer includes respective quantities of ethylene vinyl acetate and chlorinated polyolefin material. Preferably, the ratio of chlorinated polyolefin to ethylene vinyl acetate is up to about 1:12, with the chlorinated polyolefin containing from about 15 to 46% by weight chlorine and having a molecular weight of from about 3,000 to about 65,000. The ethylene vinyl acetate preferably has a vinyl acetate content of from about 28 to 60% by weight and a melt index (ASTM Method No. D1238) of from about 3 to 70. The most preferred primer coating composition comprises about a 25% solids by weight dispersion in toluene, with the solids fraction comprising about 3 parts ethylene vinyl acetate to about 1 part of chlorinated polyolefin material. This composition has been found to provide an exceptionally strong bond between the substrate and PVA remoistenable adhesive.

The outermost adhesive layer comprises the dried residue of a water-based coating composition having a solids fraction composed principally of polyvinyl alcohol dispersed in water. Preferably, the adhesive composition solids fraction is at least about 50% by weight partially hydrolyzed polyvinyl alcohol. The overall coating composition is generally fairly dilute, i.e., from about 75 to 96% by weight water. In the most preferred form, the adhesive composition comprises about a 15% solids by weight dispersion in water, with the solids fraction comprising about 95% by weight partially hydrolyzed polyvinyl alcohol (advantageously from about 70 to 90% hydrolyzed, most preferably about 88% hydrolyzed) and about 5% by weight polyvinyl pyrrolidone.

In the production of a remoistenable ribbon, for example, one or both of the opposed faces of the ribbon can be coated with the primer and adhesive layers. This is generally accomplished by sequentially applying and drying the primer and adhesive compositions onto the web to effect bonding between the substrate, primer layer and adhesive layer. In practice, each of the layers can be applied by any conventional means, such as by running the web through coating tanks and thereafter removing any excess liquid material. The primer and adhesive coating compositions are generally applied hot, i.e., at a temperature of from about 120° to 230° F., and most advantageously from about 165° to 195° F. The web can then be squeegeed as it emerges from the coating tanks in order to achieve a desirable thin layer of primer and adhesive composition. In this connection, a primer layer of from about 1/10 to 1 mil. in thickness is preferred, with an adhesive layer of from about ¼ to 1 mil. An adhesive layer of below about ¼ mil. can in some instances be excessively lubricious upon wetting and thus not suitable.

Drying of the initially liquid primer and adhesive coating composition can be accomplished by any conventional means, including drying in air at ambient temperatures. In the preferred method, the primer composition is air-dried with hot air at a temperature of up to about 300° F., while the adhesive composition is similarly dried with air at a temperature from about room temperature to about 250° F. It is to be understood, however, that any conventional means known in the art of applying coatings to web material could be used in applying the primer and adhesive coatings.

The following example will illustrate the production of remoistenable polyolefin ribbons in accordance with the invention, and also demonstrate the desirable remoistenable adhesive properties thereof. The example is presented by way of illustration only, and nothing therein should be taken as a limitation upon the overall scope of the invention.

EXAMPLE

The following experiment was undertaken to demonstrate the peel strengths of remoistenable adhesives in accordance with the present invention, as compared with conventional systems.

Two separate tests were undertaken to measure comparative peel strengths. In each test ¾-in. wide chemically foamed and monoaxially oriented polypropylene ribbons (0.005 in. thick) were used as substrates. The ribbons were continuously drawn through hot primer and adhesive coating baths with excess solution being squeegeed off both sides of the ribbon as it emerged from the coating baths. The ribbons were also hot-air dried after after both coating operations. The various coatings used had compositions specified as follows:

| | |
|---|---|
| Primer I: | 25% solids solution of chlorinated polypropylene in Xylene (M.W.: 3,000-18% chlorine), sold by Eastman Chemical Products, Inc. under the designation CP 343-1. |
| Primer II: | 20% solids solution of chlorinated polyethylene in toluene (M.W.: 50,000-46% chlorine), sold by The Down Chemical Company under the designation CPE XO-2243.51. |
| Primer III: | 25% solids solution of chlorinated polyethylene in Xylene (M.W.: 3,000-20% chlorine), sold by Eastman Chemical Products, Inc., under the designation CP 153-2. |
| Primer IV: | 25% solids solution of ethylene vinyl acetate, in toluene (42% vinyl acetate), sold by the E. I. DuPont De Nemours & Co. under the designation Elvax 40. |
| Primer V: | 20% solids solution of ethylene vinyl acetate in toluene (55% vinyl acetate), sold by U.S. Industrial Chemical Company under the designation Vynathene EY 906. |
| Primer VI: | 25% solution of general purpose, high tenacity pressure sensitive silicone-based adhesive in toluene, sold by the Dow Corning Company under the designation 282. |
| Primer VII: | 25% solids solution containing 1 part CP 343-1 to 3 parts Elvax 40 in toluene. |
| Primer VIII: | 25% solids solution of 1 part CP 343-1 to 3 parts Vynathene EY 906 in toluene. |
| Primer IX: | 20% solids solution of 1 part CPE XO-2243.51 to 3 parts Elvax 40. |
| Adhesive I: | 15% solution of 95 parts partially hydrolyzed polyvinyl alcohol to 5 parts polyvinyl pyrrolidone (K-30 sold by the G.A.F. Company) in water. |
| Adhesive II: | 25% solution of a conventional envelope adhesive in water. |
| Adhesive III: | 50% solids solution of dextrin in water. |
| Standard: | 3M Scotch brand magic transparent tape no. 801. (In this instance the tape was manually applied over the primer layer.) |

The above primer and adhesive compositions were applied in equal thicknesses and under identical conditions during all tests, save for the adhesive standard which was simply pressed onto the substrate in the normal manner. Peel strengths were measured by moistening a ¾-in. length of the coated ribbon sample and pressing the moistened section onto a similar unmoistened length of the same sample. Five specimens each were thus prepared and allowed to oven dry at 90° C. for 60 minutes. The non-adhered ends of each specimen were placed in clamps, one retractable and one attached to a Hunter Model LKE-05 force gauge, and pulled at a rate of 2 ft./min. The maximum force registered, as the bond was peeled apart, was recorded for each sample and the average computed. These results are shown in Table I below:

TABLE I

PEEL STRENGTHS

Test 1

| Primer | Adhesive | Peel Strength gm/in. | %[1] |
|---|---|---|---|
| None | I | 179 | 100 |
| None | Standard | 399 | 223 |
| I | I | 596 | 336 |
| II | I | 396 | 222 |
| III | I | 443 | 248 |
| IV | I | 405 | 227 |
| V | I | 377 | 211 |
| VI | I | 495 | 277 |
| VII | I | 505 | 283 |
| VIII | I | 651 | 364 |
| IX | I | 371 | 207 |

Test 2

| Primer | Adhesive | Peel Strength gm/in. | %[1] |
|---|---|---|---|
| VII | I | 339 | 244 |
| VII | II | 108 | 78 |
| VII | III | 127 | 91 |
| None | I | 139 | 100 |
| None | II | 0 | 0 |
| None | III | 0 | 0 |
| None | Standard | 314 | 227 |

[1]Percentage peel strength based upon no primer and adhesive coat I as 100%.

Test 1 illustrates that the best peel strengths were obtained using primer VIII with adhesive coat I. However, all other combinations are in the range of valuable and usable strengths. Hence, it will be clear that essentially any primer having the characteristics of bonding to both the substrate and covering adhesive are usable in the present invention. Test 2 illustrates that the PVA adhesive coat has some peel strength even on untreated polypropylene substrate, whereas the other two top coats do not. Further, use of one of the preferred primer formulations increased the peel strength of the top coat, as with Test 1. Therefore, it is clear that a type of synergism is demonstrated through the use of primer and adhesive coats in accordance with the invention, and particularly among the most preferred chlorinated polyolefins, ethylene vinyl acetates and polyvinyl alcohols employed in the respective layers.

Although not completely understood, it is hypothesized that this synergism obtains in the preferred embodiment by virtue of the chemical similarity of the polypropylene substrate and chlorinated polyolefins in the primer coating that makes possible a firm bond between the substrate and primer. On the other hand, the chemical similarity between the copolymerized olefinic vinyl acetate of the primer coating and the polyvinyl alcohol of the remoistenable adhesive coating ensures that an adequate bond is established between the primer and adhesive layers.

It will also be seen that the peel strengths recorded match or exceed those recorded using the standard tape. This implies that the remoistenable adhesive applied is essentially equal or better than the standard tape in terms of peel strength, and thus the utility of the present invention is manifest.

Having thus described the invention, what is claimed as new and desired to be secured by Letters Patent is:

1. A remoistenable polyolefin web, comprising:
   a substrate formed of a polyolefin material;
   a primer layer applied to at least one face of said substrate, said primer layer comprising the dried residue of a coating composition applied in liquid form and consisting essentially of a chlorinated polyolefin and a copolymerized olefinic vinyl acetate; and
   a remoistenable adhesive layer applied over said primer layer and principally comprising a polyvinyl alcohol,
   said primer layer having the properties of bonding to said substrate and to said remoistenable adhesive layer.

2. The remoistenable web as set forth in claim 1 wherein said substrate is formed of polypropylene material.

3. The remoistenable web as set forth in claim 1 wherein said primer layer comprises the dried residue of a coating composition which includes ethylene vinyl acetate as the vinyl acetate component thereof.

4. The remoistenable web as set forth in claim 1 wherein the ratio of chlorinated polyolefin to vinyl acetate is up to about 1 to 12 parts by weight.

5. The remoistenable web as set forth in claim 1 wherein said chlorinated polyolefin contains from about 15 to 46% chlorine and has a molecular weight of from about 3,000 to 65,000.

6. The remoistenable web as set forth in claim 3 wherein said ethylene vinyl acetate has a vinyl acetate content of from about 28 to 60% by weight and a melt index of from about 3 to 70.

7. The remoistenable web as set forth in claim 1 wherein said coating composition comprises about a 25% solids by weight dispersion in toluene, with the solids fraction comprising about 3 parts vinyl acetate to about 1 part of chlorinated polyolefin material.

8. The remoistenable web as set forth in claim 1 wherein said primer layer is from about 1/10 to 1 mil. in thickness.

9. The remoistenable web as set forth in claim 1 wherein said adhesive layer comprises the dried residue of a coating composition which includes a solids fraction comprising principally partially hydrolyzed polyvinyl alcohol dispersed in water.

10. The remoistenable web as set forth in claim 9 wherein said coating composition is from about 75 to 96% by weight water.

11. The remoistenable web as set forth in claim 9 wherein said polyvinyl alcohol is from about 70 to 90% hydrolyzed.

12. The remoistenable web as set forth in claim 9 wherein said composition comprises about a 15% solids by weight dispersion in water, with the solids fraction comprising about 95% by weight partially hydrolyzed polyvinyl alcohol and about 5% by weight polyvinyl pyrrolidone.

13. The remoistenable web as set forth in claim 1 wherein said adhesive layer is from about ¼ to 1 mil. in thickness.

14. The remoistenable web as set forth in claim 1 wherein said primer and adhesive layer are applied to the opposed faces of said substrate.

* * * * *